United States Patent [19]
Moutrey et al.

[11] Patent Number: 5,851,043
[45] Date of Patent: Dec. 22, 1998

[54] LINER FOR A WORK MACHINE BODY

[75] Inventors: Theodore A. Moutrey, Taylorville; Jack W. Kelsheimer, Dalton City, both of Ill.; Rick J. Reynolds, Casper, Wyo.

[73] Assignee: Caterpillar Inc., Peoria, Ill.

[21] Appl. No.: 978,327

[22] Filed: Nov. 25, 1997

Related U.S. Application Data

[60] Provisional application No. 60/031,475 Nov. 25, 1996.

[51] Int. Cl.[6] .................................................. B52D 33/02
[52] U.S. Cl. .......................................... 296/39.2; 298/1 R
[58] Field of Search ................................. 296/39.2, 39.1; 298/1 R

[56] References Cited

U.S. PATENT DOCUMENTS

| | | |
|---|---|---|
| 3,159,420 | 12/1964 | McCrossen . |
| 3,480,321 | 11/1969 | Brandt et al. ............................. 296/28 |
| 3,578,375 | 5/1971 | Finefrock ................................ 296/39.2 |
| 3,652,123 | 3/1972 | Speers . |
| 3,814,473 | 6/1974 | Lorenzen, Jr. . |
| 3,881,768 | 5/1975 | Nix . |
| 3,953,950 | 5/1976 | Sudyk ....................................... 52/127 |
| 4,531,781 | 7/1985 | Hunt et al. . |
| 4,752,098 | 6/1988 | Shock . |
| 4,974,895 | 12/1990 | Davenport ............................... 296/39.2 |
| 5,131,709 | 7/1992 | Spica . |
| 5,172,953 | 12/1992 | Chamberlain . |
| 5,185,980 | 2/1993 | Rydberg et al. . |
| 5,207,472 | 5/1993 | Gower . |
| 5,460,431 | 10/1995 | McWilliams . |
| 5,518,285 | 5/1996 | Dick . |
| 5,562,321 | 10/1996 | VanHoose . |
| 5,597,194 | 1/1997 | Daugherty et al. ..................... 296/39.2 |
| 5,599,055 | 2/1997 | Brown .................................... 296/39.2 |

FOREIGN PATENT DOCUMENTS

| | | |
|---|---|---|
| 1556209 | 1/1970 | Germany . |
| 1257456 | 12/1971 | United Kingdom . |
| 96/32313 | 10/1996 | WIPO . |

*Primary Examiner*—Joseph D. Pape
*Attorney, Agent, or Firm*—William B. Heming; John J. Cheek

[57] ABSTRACT

A liner for a body such as of an off-highway truck protects the body from wear. The liner has a plate with openings through the plate arranged in a preselected pattern. The plate is of a size to fit a particular portion of the body and is typically removably fastened to the body. The openings in the plate cause material to tumble, instead of to slide, when being removed from the truck. The tumbling action, and the thickness of the plate, reduces wear on the body during material dumping.

14 Claims, 3 Drawing Sheets

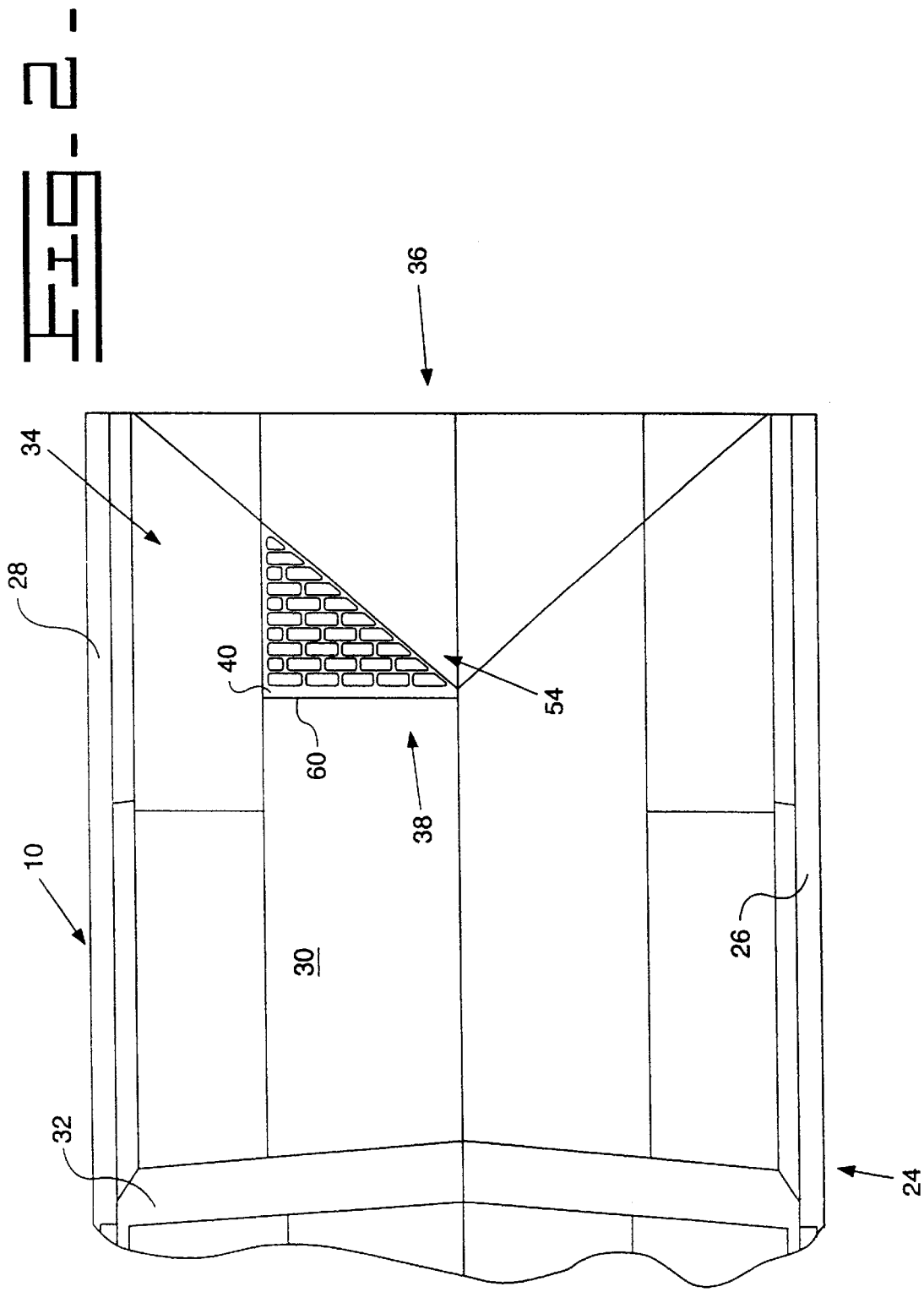

Fig-3-
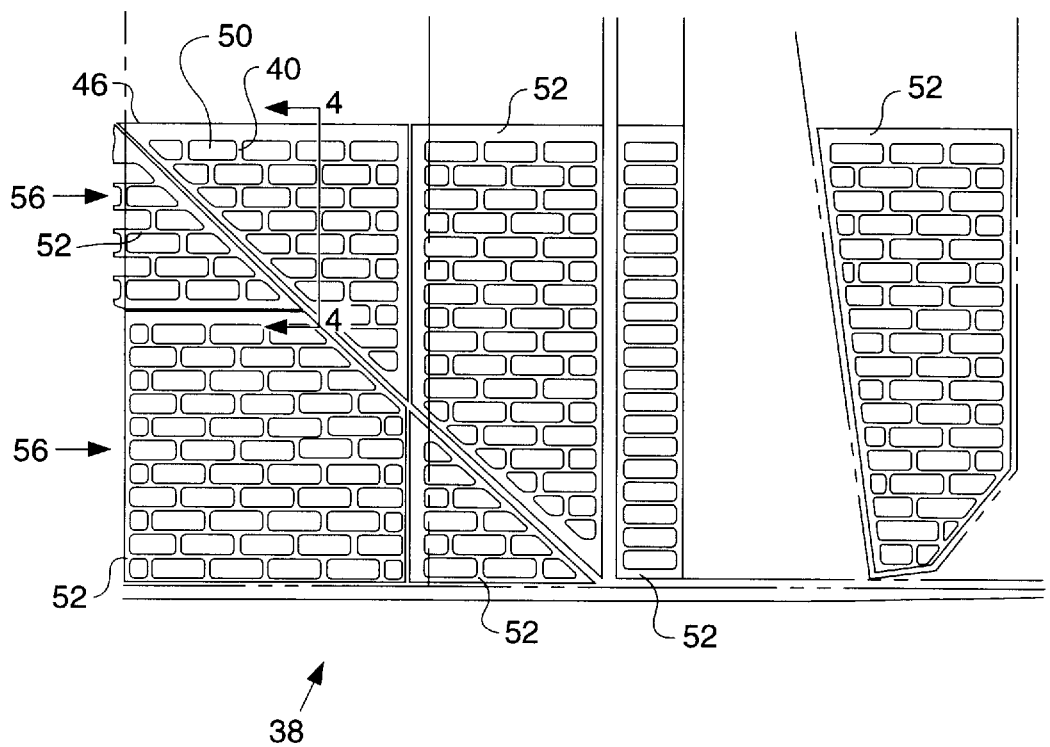
Fig-4-
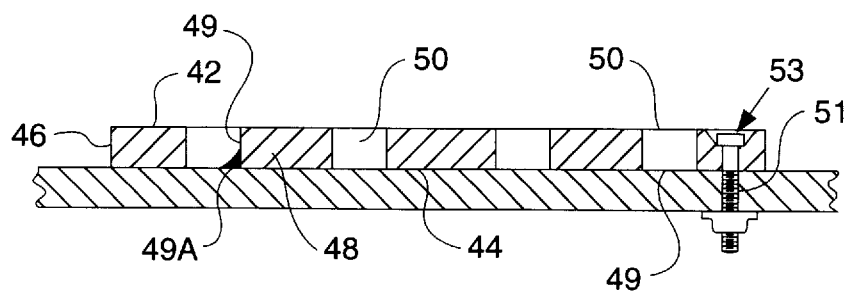

LINER FOR A WORK MACHINE BODY

CROSS-REFERENCE TO RELATED APPLICATIONS

This application claims the benefit of prior co-pending provisional patent application no. 60/031,475, filed Nov. 25, 1996.

1. Technical Field

The invention relates to liners for protecting material carrying bodies from wear, such as occurs in trucks beds. More particularly, the invention relates to liners which cause material to tumble instead of slide when dumping from a truck body.

2. Background Art

Work machines which carry material are subject to wear through the movement of material in the body of the machine. For example, an off-highway truck typically has a material-carrying body which can be moved to an upright position to eject the material through an opening in the body. This wear is particularly aggravated, for example, by the sliding of material across the portion of the bed or floor adjacent the rear opening from which the material is ejected. Other trucks for hauling and dumping may have similar problems with wear.

In an attempt to reduce wear, many solutions have been tried. For example, sheets of material as liners are sometimes added to a truck body to provide additional protection. However, such liners are still subject to the same high wear of sliding materials as the truck bodies they protect. Another solution has been to attach bars to the bed or floor of a truck body in rows across the width of the bed. Similarly, a cross hatch of plates approximately two inches high have been added to provide "boxes" on the bed of the truck. The bars or boxes cause material to tumble instead of slide as it moves across the truck bed to be ejected from the rear opening. This tumbling motion reduces wear by tending to eliminate the high wear characteristics of sliding material.

These so-called tumbler bars or boxes require a considerable amount of welding to attach, involve the handling of a large number of different parts, are limited in the way they can be attached (typically only by welding) and are susceptible to breaking loose. If they do break loose, the metal parts can be ejected from the truck body into another material handling device, such as a rock crusher, and cause damage to that device.

Therefore, it is desirable to provide a solution to the above problems.

DISCLOSURE OF THE INVENTION

In one aspect of the present invention, a prefabricated liner for a work machine body is provided. The liner includes a plate which has top and bottom surfaces and a select size to fit a portion of the work machine body. The bottom surface of the plate rests on the machine body for supporting loads in the machine body. The plate has openings arranged in a pattern and which pass through the plate from the top surface to the bottom surface.

In another aspect of the invention, a body for a work machine includes a bed with sides and a bottom connected to form a material containing cavity. The body further includes a plate attached to at least a portion of the body in fitted relationship therewith. The plate has top and bottom surfaces and rests on the machine body for supporting loads in the machine body. The plate has openings arranged in a pattern and which pass through the plate from the top surface to the bottom surface.

BRIEF DESCRIPTION OF THE DRAWINGS

FIG. 2 is a plan view of a truck body of the off-high truck of FIG. 1 showing an embodiment of the present invention;

FIG. 3 is a plan view of a portion of a liner according to the present invention showing its configuration in detail; and FIG. 4 is a cross-sectional view of a plate used in the present invention.

BEST MODE FOR CARRYING OUT THE INVENTION

Figure 1:
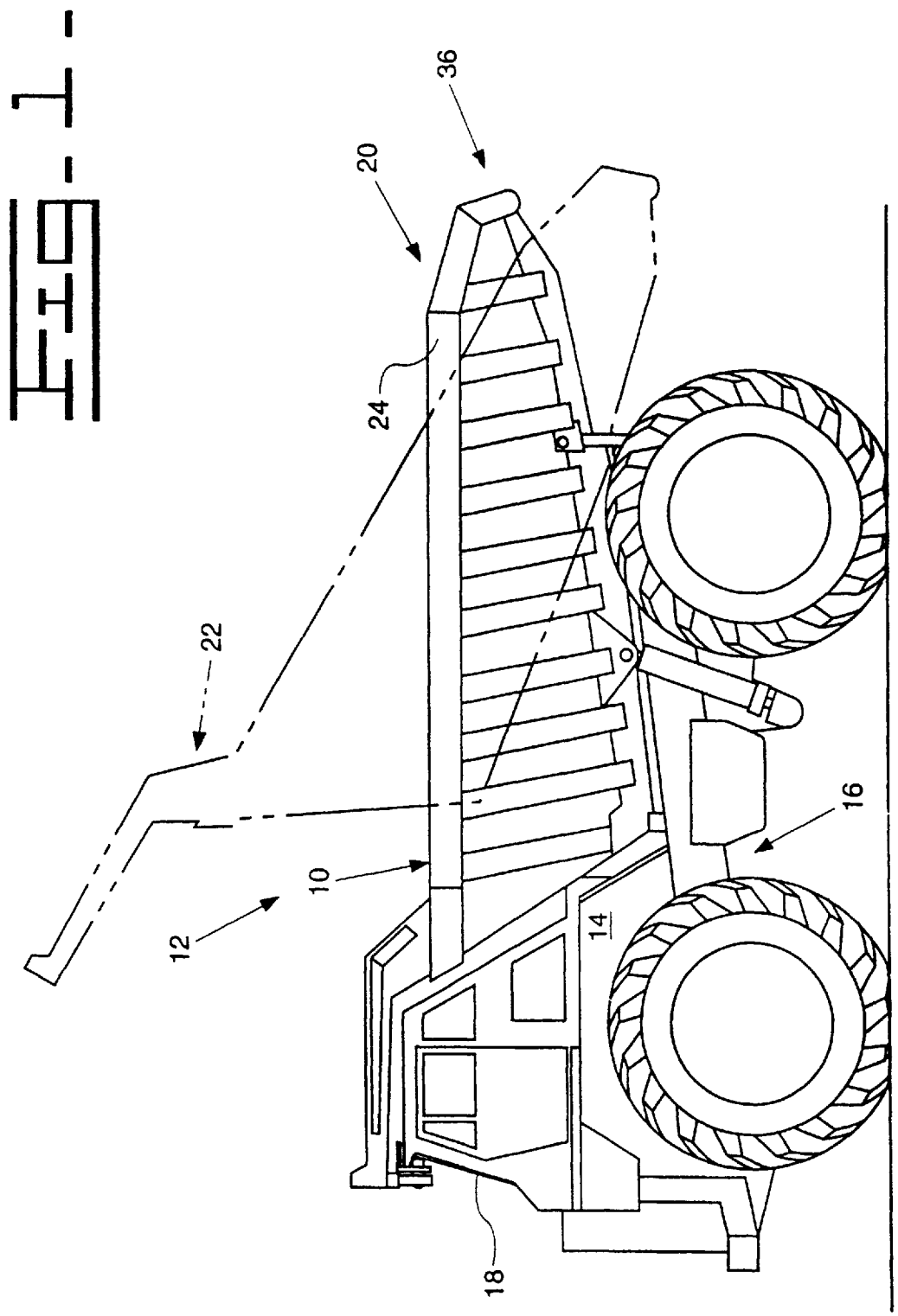
FIG. 1 is a side view of an off-highway truck on which the present invention may be used.

Referring to FIG. 1, a body 10 for a work machine 12 is shown as, for example, the material carrying body of an off-highway truck 14. The body 10 is constructed and is of an appropriate configuration to receive, transport and dump loads for earthmoving and construction purposes as is well known in the art. Typically, the body 10 is carried on a chassis 16 having a cab 18 from which an operator can control the orientation of the body 10 to be positioned in a horizontal, or load receiving and carrying, position 20, through a relatively upright position 22 (shown in phantom) from which a load, such as dirt, coal or other material can be dumped.

Referring now to FIG. 2, the body 10 has a bed 24 which includes first and second sides or sidewalls 26,28, a bottom 30 and a forward or end wall 32. The first and second sides 26,28 and end wall 32 are each connected to the bottom 30. Each of these elements is of a desired size, which is defined to be dimension and shape, such that a load carrying cavity 34 is formed of desired configuration for the type of load carried. The load carrying cavity 34 has a rear opening 36 through which material escapes when the bed 24 is moved from the horizontal 20 to the upright position 22. A rear gate or other device at the rear opening 36 is sometimes used in other types of trucks to contain the load.

The bed 24 construction utilizes essentially flat sections of material in specific shapes and oriented at different angles when connected one to other to form the load carrying cavity 34. In some cases, the sides 26,28, end wall 32 or bottom 30 may be contoured if desirable.

For convenience, the sides 26,28, end wall 32 and bottom 30 are referred to in describing the bed 24. However, it should be understood that this is done to describe the general construction of a bed. The present invention is not dependent upon strictly delineating which or whether a portion of a bed may be a side or bottom.

Referring to FIGS. 2 and 3, a liner 38 is disclosed for protecting the body 10, particularly in the high wear portions where it is cost effective to provide additional protection. In off-highway trucks, the high wear portions are typically the approximate one-third of the bed 24 adjacent the rear opening 36.

The liner 38 consists of at least one plate 40. For convenience, only the construction and use of the plate 40 of the liner 38 will be described, but it should be understood that other plates 52 shown as part of the liner 38 are similarly constructed and installed on the body 10.

Referring particularly to FIGS. 3 and 4, the plate 40 has a top surface 42 and bottom surface 44, a leading edge 46, and additional edges. The plate 40 also has openings 50 and is of substantially the same size as the portion of the body 10 on which it is installed as further described below. Size in this context refers to the shape and dimensions of the plate 40, as well as any contour of the body 10 if present. One half of a complete liner 38 for the body 10 is shown in FIG. 3, including the portion or plate 40 shown installed in FIG. 2 and additional plates 52. In that the truck body 10 is symmetrical, the other one-half of the liner will be identical. In other machine applications, more of the bed, or specific portions of the bed, may be subject to unacceptable wear. In those cases, a different liner according to the present invention may be adapted for such purposes.

Plate 40 is positioned on the portion 54 of the bed 24 it is intended to protect, with the bottom surface 44 resting on the bottom 30 bed 24. The plate 40 is positioned in fitted relationship with said portion 54 so that the shape mates with the corresponding elements of shape of the bed portion 54 to be protected.

Because the body 10 shown is comprised of flat elements of select sizes, the plates 40,52 are of flat sheets of material of appropriate sizes which rest against the corresponding portion of the bed 24. Where a bed may have a contour, which includes curvilinear configurations, the plate could similarly be configured to fit with a portion of the bed 24.

The openings 50 of plate 40 pass through or are formed in the plate 40 and extend from the top surface 42 to the bottom surface 44. The openings 50 are arranged in a preselected grid pattern for purposes hereinafter described. In particular, the openings 50 shown are spaced about two inches apart and have a dimension of about 4 inches by 12 inches. The openings 50 are positioned in rows 56 with the openings 50 staggered so that the spaces between openings 50 on adjacent rows do not line up. This reduces the opportunity for bending or cracking of the plate 40 and facilitate its operation.

The plates 40,52 can be attached to the bed 24 in a variety of ways, preferably for removal of a plate when worn. Because of the heavy duty application in off-highway trucks, a preferred approach is to weld the plates to the bed. Welding resists vibration and is durable, and the plates are removable through breaking of the welds for replacement purposes.

Referring now to FIG. 2, the plate 40 is shown attached by a weld 60 at the leading edge 46 and at other locations to be described. The leading edge is defined as the edge of the side or sides of a plate which is or are oriented on the bed 24 at a position opposite the point at which the material is dumped from the body 10. In other words, the leading edge is the portion of the plate 40 against which material first moves as it is ejected from the cavity 34. It is important that this edge 46 be securely fastened and, when welding is used to fasten the plate, this leading edge 46 is typically welded along its entire length. Additionally, it is desirable to use a fillet weld to fill an area between the truck bed 24 and plate 40 to provide a "ramp up" from the bed 24 to the plate 40. This provides a smooth transition from the bed 24 to the plate 40 for material to move across.

At other locations of the plate 40, it has been found that additional welds (not shown) only at select locations are sufficient to fasten the plate 40 to the truck bed 24. For example, it has been found satisfactory to place ⅜ inch by 4 inch welds intermittently along the edges of the plate 40 defined by the sides or portions of the sides not constituting the leading edge and to provide some welds 49A (FIG. 4) at the side surfaces 49 which define the openings 50. It is recommended that such welds be made on about thirty percent of the openings 50 of the plate 40.

Additionally, notches can be cut in the plates 40,52 to indicate where welding is to be done, to help in the installation of the plates 40,52.

The severe applications in which off-highway trucks are used require that extremely durable materials be used to provide a liner 38 of useful life. In the example described above for removably fastening the liner 38 by welding, steel plates of 16 to 20 millimeters thickness are contemplated with a Brinell hardness of approximately 400. To increase durability, steel material of 500 Brinell may be used. However, steel material of this hardness does not lend itself to welding because of the difficulty of preheating the steel sufficiently. Therefore, an alternative fastening system utilizing bolts or rivets, for example, can be used. In order to assure reasonable longevity of such a fastener, it is desirable that the head of the bolt or rivet be recessed into the plate 40. It would also be desirable to place a number of fasteners along the leading edge 46 of the plate 40 and also at other locations. A preferred fastener is the Huck C50L Fastening System manufactured by Huck, a Federal Mogul Company. The fastener includes a head of a bolt 51 which recesses in a conical bore of an opening 53 in the plate 40 and has a flanged, threaded collar 55 to receive the threaded portion of the bolt on the underside of the body 10, as shown diagrammatically in FIG. 4.

Industrial Applicability

The disclosed liner 38 provides an extremely durable and flexible approach to protecting the truck body 10 from wear. The plate or plates 40,52 of the liner 38 can be prefabricated and replaced when worn. This is particularly convenient in off-highway truck applications where the trucks are too large to transport distances for repair and downtime of a truck is costly.

The openings 50 in the plate 40 cause material escaping from the cavity 34 to tumble instead of to slide, because material as it moves toward the rear opening 36 will tend to catch on the sides or edges of the openings 50. The liner 38 thus reduces wear to the parent body 10 through not just the protection afforded by the thickness of the liner 38 itself, but also the tumbling action. Further, the openings 50 will also trap fine material therein and in spaces between the plate 40 and the bed 24, insulating the bed 24 from impact and wear.

The grid pattern of the openings 50 and the opening shapes shown in the drawings have functioned well in practice, and are also convenient to manufacture. For example, the openings 50 can be cut on a flame cutting table, and they do not require a high degree of tolerance in placement or size because of the application.

Other aspects, objects and advantages of this invention can be obtained from a study of the drawings, the disclosure and appended claims.

We claim:

1. A prefabricated liner for a high wear portion of the body of a work machine, said body being positionable in a substantially upright position in which load :material is ejected from the body, comprising:

a plate having top and bottom surfaces, a plurality of openings, and being of substantially the same size as the high wear portion of said work machine body, said openings passing through said plate from said top surface to said bottom surface and being arranged in a preselected pattern, said openings causing said load material to tumble rather than slide across the top surface of said plate when said material is ejected from said body, said bottom surface being of a configuration sufficient for resting on said work machine body for said plate to support loads in said work machine body.

2. The prefabricated liner of claim 1 wherein said portion of said work machine body has a contour and said bottom surface of said plate has a mating contour.

3. The prefabricated liner of claim 1 wherein said plate is removably attached to said portion of said work machine body.

4. The prefabricated liner of claim 3 wherein said plate is attached to said portion of said work machine body by at least one bolt.

5. The prefabricated liner of claim 3 wherein said plate is attached to said portion of said work machine body by at least one weld.

6. The prefabricated liner of claim 1 further comprising fastening means for removably attaching said plate to said portion of the said work machine body.

7. The prefabricated liner of claim 6 wherein said fastening means includes an opening for receiving a fastener.

8. The prefabricated liner of claim 1 wherein said openings in said plate are positioned in a plurality of rows, the openings in each row being staggered from the openings in the adjacent row.

9. A load-carrying body for a work machine, comprising:
   a bed having first and second sides, a bottom and a rear opening, said first and second sides and said bottom being connected to form a material containing cavity, said bed being adapted to be positioned in a substantially upright position in which load material is ejected from said material containing cavity; and
   a plate having top and bottom surfaces, a plurality of openings, said openings passing through said plate from said top surface to said bottom surface and being arranged in a preselected pattern, said bottom surface of said plate resting on said bed, said plate being positioned in fitted relationship with at least a part of said bed in a manner sufficient for supporting loads in said bed, said openings in said plate causing load material ejected from said material containing cavity when said bed is in an upright position to tumble rather than slide across the top surface of said plate.

10. The body of claim 9 wherein said bed has an opening through which material escapes from said material containing cavity, said plate has a leading edge positioned in the bed opposite said bed opening and including a fastening system attaching said plate to said bed, said fastening system having at least one fastener at said leading edge.

11. The body of claim 10 wherein said fastening system includes a weld between said plate and bed at the leading edge of said plate.

12. The body of claim 11 wherein said plate has side surfaces defining said openings therethrough and said fastening system further includes welds between the side surface of at least one of said opening and said bed.

13. The body of claim 10 wherein said fastening system includes a bolt.

14. A work machine adapted to transport and dump load material, comprising:
   a chassis;
   a load-carrying body carried on the chassis and movable between a substantially horizontal load carrying and receiving position and a substantially upright load ejecting position, said body comprising;
   a bed having first and second sides, a bottom and a rear opening, said first and second sides and said bottom being connected to form a material containing cavity; and
   a plate having top and bottom surfaces and a plurality of openings, said openings passing through said plate from said top surface to said bottom surface and being arranged in a preselected pattern, said bottom surface of said plate resting on said bed, said plate being positioned in fitted relationship with at least a part of said bed in a manner sufficient for supporting loads in said bed, said openings in said plate causing load material ejected from said material containing cavity when said body is in the load ejecting position to tumble rather than slide across the top surface of said plate.

* * * * *